Figure 1:
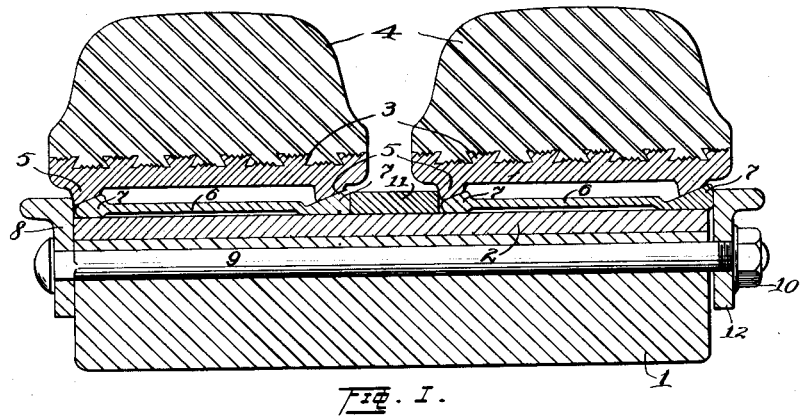

R. S. BRYANT.
RIM FOR VEHICLE WHEELS.
APPLICATION FILED NOV. 27, 1912. RENEWED SEPT. 13, 1915.

1,163,736.

Patented Dec. 14, 1915.
2 SHEETS—SHEET 1.

Witnesses:
P. L. Druck
Brennan B. West

Inventor
Richard S. Bryant
By Hull & Smith
Attys.

R. S. BRYANT.
RIM FOR VEHICLE WHEELS.
APPLICATION FILED NOV. 27, 1912. RENEWED SEPT. 13, 1915.
1,163,736.
Patented Dec. 14, 1915.
2 SHEETS—SHEET 2.
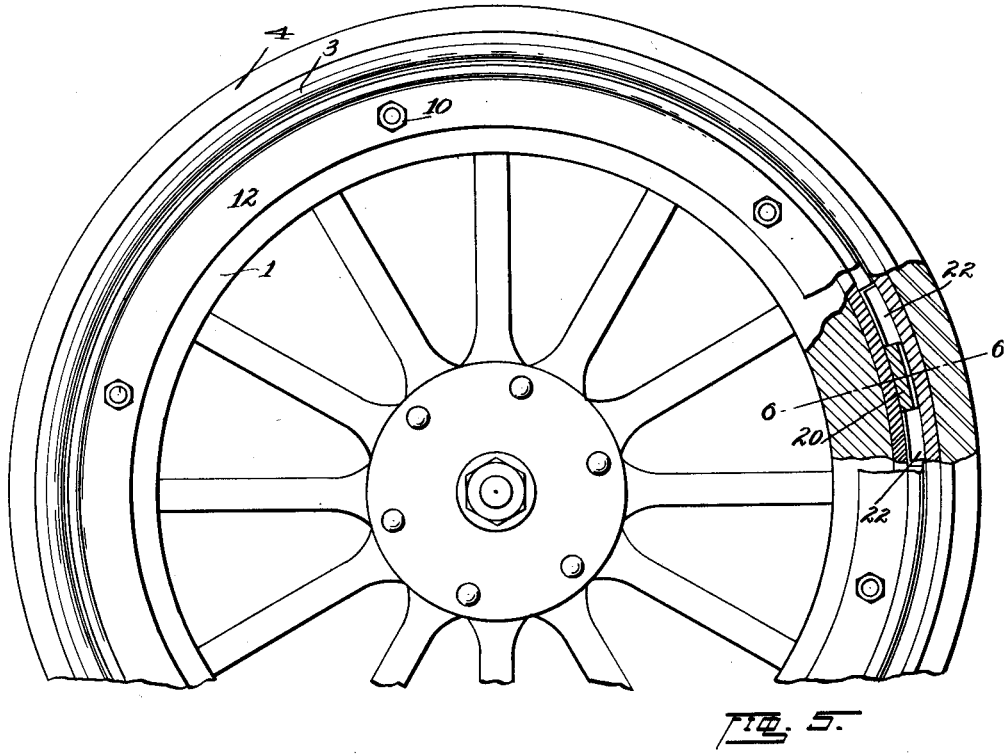
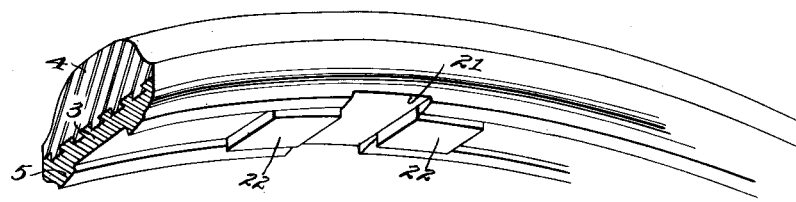
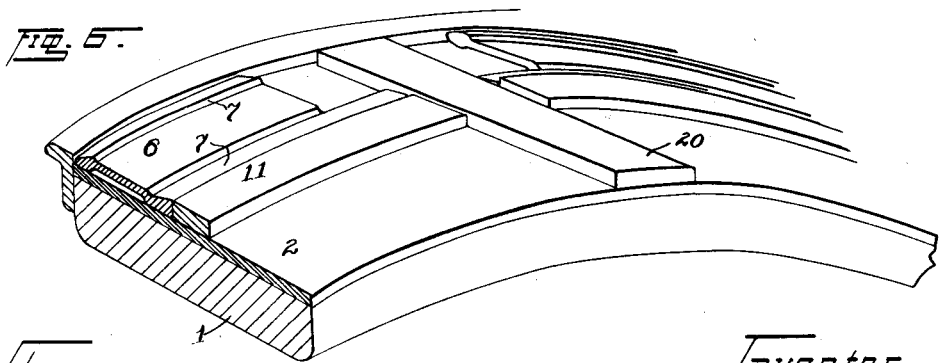
Witnesses:
R. L. Bruck
Brennan B. West
Inventor
Richard S. Bryant
By Hull & Smith,
Attys

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,163,736.     Specification of Letters Patent.     Patented Dec. 14, 1915.

Application filed November 27, 1912, Serial No. 733,816. Renewed September 13, 1915. Serial No. 50,533.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and particularly to that type of wheel wherein is provided a plurality of detachably secured tire-receiving rims. In heavy trucks and other commercial vehicles, it is a frequent practice to employ two rims and tires side by side upon the same wheel, the better to support the weight of the vehicle and the torque of its propulsion. This is cheaper than employing a single tire of sufficient size to support the whole duty, enables a lighter construction to be used, and renders repairs and upkeep cheaper because of the fact that the tires can be replaced separately, old and new tires being used together if desirable. At the same time, the same considerations advocate the forming of the rims readily removable from the felly, as in the case of pleasure vehicles, and the carrying of an extra rim together with a tire ready for instant replacement in case of emergency. It is the custom on commercial vehicles, to employ this twin construction only on the rear wheels which support the greater part of the weight of the vehicle and also withstand the driving torque. The forward wheel is generally of single rim construction as in the usual case.

The objects of this invention are the provision of a new and improved construction of parts whereby two rims and tires can be secured side by side upon the felly of the vehicle, such means being of great lightness, strength, simplicity, and reliability; the provision of a construction which shall permit the same rim and tire and the same locking or retaining means to be employed either upon the forward wheel (whereon only a single tire is used) or upon the rear wheel whereon two or more rims and tires are employed; the provision of a construction whereby the rims are automatically trued up in the process of securing them in place to the end that they may at all times lie strictly parallel to the plane of the wheel; the provision of a construction wherein the total thickness of felly and rim is materially less than previous devices of this nature; while further objects and advantages of the invention will become apparent as the description proceeds.

Figure 2:
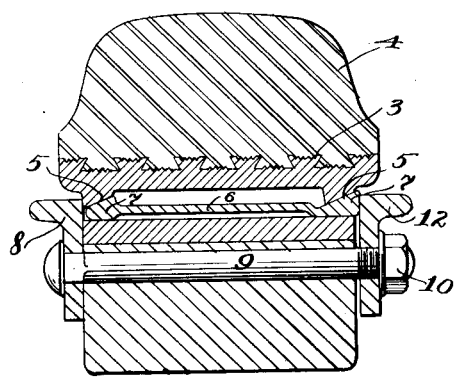
Figure 4:
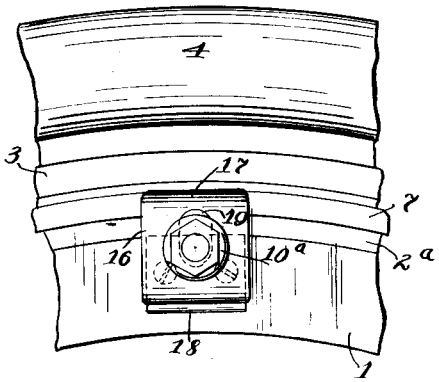
Figure 3:
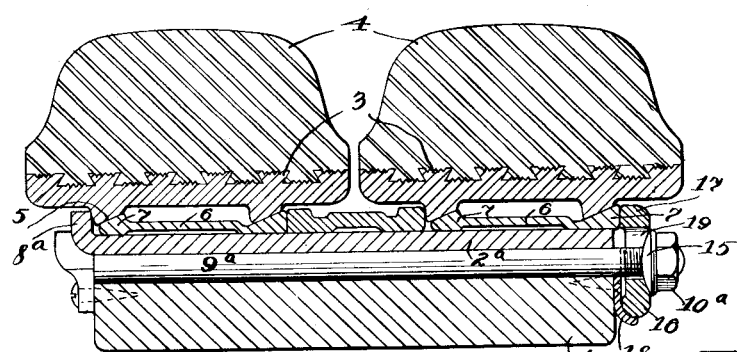

Generally speaking, my invention may be defined as consisting of the combinations and constructions recited in the claims hereto annexed and illustrated in the drawings accompanying and forming a part of this application, wherein:

Figure 1 is a transverse cross-sectional view of a portion of a plural rim wheel provided with my improved rim securing expedient; Fig. 2 is a similar view of a portion of a wheel equipped with a single rim; Fig. 3 is a transverse cross-sectional view of a twin rim wheel illustrating a slightly modified form of felly band and of securing mechanism; Fig. 4 is a view in side elevation of a portion of the face of the rim and wheel illustrating the type of securing clip employed in Fig. 3. Fig. 5 is a view in side elevation of a portion of a wheel equipped with the rim of my invention, a portion of the rim and felly being broken away so as to disclose the driving lugs; and Fig. 6 is a partial perspective view showing the felly and rim slightly separated and illustrating the construction and arrangement of the various parts.

Describing the parts by reference characters, 1 represents the felly of a twin rim wheel, this felly being of wood or any other suitable material and constructed in the usual or any suitable manner, but being of sufficiently great width to accommodate two rims and tires side by side. In the construction illustrated in Fig. 1 this felly is illustrated as surrounded by a felly band 2 of smooth cylindrical form and having its lateral edges terminated flush with the sides of the felly 1. In case a wooden felly be employed, this felly band is essential to the construction of the wheel, since it serves to bind together the various sections of the felly. In case a metal or other wheel be employed, the felly and felly band will doubtless be made in one piece. It will therefore be understood that the particular construction of the wheel has no bearing upon the present invention so long as that wheel furnishes a circular seat for my improved rim and rim-securing means, wherefore I shall designate the wheel portion generally by the term "circular member" or "wheel body". Surrounding said circular member are a plurality of annular rims 3—3, each of which has secured to its outer face in any convenient or suitable manner a tire 4 of any suitable material or construction. The inner face of each of those rims is formed with a pair of laterally spaced circumferential ribs 5—5 having their inner faces beveled in the same direction, and interposed between each of the rims 3 and the circular member which it surrounds is a wedge ring 6 having laterally spaced thickened portions 7 whose faces are inclined complementarily to the faces of the ribs 5—5. This ring is split as shown in Fig. 6 so as to permit its expansion and contraction and engages with its inner face the periphery of the felly band 2 or other seating member upon which it is mounted, the distance between the wedge portions 7—7 thereof being such as to cause said portions to engage substantially simultaneously the faces of the ribs 5—5 when the ring and rim are moved laterally respectively to each other, and thereby wedge said rim firmly about the circular member. The rearward side of the circular member carries a suitable abutment member, the abutment member shown in Fig. 1 consisting of a flange ring 8 secured to the side of the felly band by means of bolts 9 traversing the felly and having nuts 10 threaded upon their protruding ends. The exterior portion of this abutment projects outwardly sufficiently to cause it to engage some portion of the rim 3 adjacent thereto, for example, the rearward side of the rearward rib 5 as illustrated in Fig. 1. Surrounding the circular member at the opposite side of the ring 6 from the abutment is a split band or ring 11 adapted to engage on one side the adjacent edge of the ring 6 and on the opposite side the adjacent portion of the outer rim. The band 11, like the abutment 8, engages only the rim and not the wedge ring at the forward side thereof, while the outer edge of the forward wedge ring 6 is engaged by a clamping ring or flange 12 secured in place by the nuts 10. In assembling the parts heretofore described, the abutment ring 8 is first secured in place by means of the bolts 9, after which the rearward rim is applied to the wheel together with its wedge ring. The band 11 is then applied after which the forward rim and its wedge ring are located upon the wheel. The clamping ring 12 is now applied to the forward face of the wheel and drawn toward the plane of the wheel by means of the nuts 10. The pressure of this ring upon the wedge ring 6 carries the forward rim transversely across the felly until it engages the band 11, which slides laterally until arrested by the inner wedge ring 6. As soon as the transverse progress of the rearward rim is arrested by engagement with the abutment flange 8, the transverse movement of its associated wedge ring operates solely to grip it more firmly about the wheel, while the reaction of these parts against the forward rim serve to clamp the latter into place with equal force. Obviously both rims will be drawn automatically into the plane of the wheel, such plane being determined by the engagement of the rearward rim with the edge of the abutment flange 8.

For purposes of comparison I have illustrated in Fig. 2 the same construction applied to a single rim, such as would ordinarily be employed in the forward wheel of a vehicle having its rear wheels constructed as in Fig. 1. It will be obvious upon inspection that all of the parts of this wheel are exactly like the parts of the wheel above described, excepting that the felly is narrow so as to receive only one rim. The same rim can be employed upon this wheel as upon the rear wheel, thus rendering all rims and tires immediately interchangeable, and avoiding the necessity for carrying different sets of parts for different wheels. The construction in Fig. 2 is introduced herein solely for comparison and to illustrate the interchangeability of the rims, this construction being specifically set forth and claimed in my copending application filed May 27, 1912, Serial No. 699,929.

The construction illustrated in Figs. 3 and 4, is exactly the same as that above described, excepting that the abutment flange, instead of being made as a separate ring secured by bolts to the side of the felly consists of an outturned lip $8^a$ formed integral with the felly band. The bolts $9^a$ have heads at their inner ends overlapping the flange $8^a$ and the side of the felly, and at their outer ends are provided with nuts $10^a$ having spherical engaging faces 15. Surrounding each of the bolts $9^a$ at the forward side of the felly is a clip 16 having a projecting portion or toe 17 adapted to engage the outer edge of the adjacent wedging ring 6. The portion of the clip at the opposite side of the bolt from this projection or toe is formed to have a rocking engagement with a felly plate 18 carried by the face of the wheel and the outer face of the clip is formed with a spherical seat engaging the correspondingly shaped face of the nut $10^a$. The clip is also formed with an elongated slot 19 merging with the seat so as to permit the toe to be shifted out of engagement with the wedge ring without the necessity of removing the same entirely from the bolt. The particular construction and operation of this clip is not however claimed in this application, being fully described and claimed in my copending application, filed May 6, 1912, Ser. No. 695,413.

For the purpose of preventing relative rotation between the wheel and rims and to sustain the driving torque, I preferably secure across the face of the circular member a transverse abutment member 20, securing the same in place by riveting, welding, or other suitable means. The wedge ring 6 and split band 11 have their ends spaced apart sufficiently to receive this member between them as illustrated in Fig. 6, while the ribs 5—5 of the rims are notched or recessed as at 21 for the reception of this abutment. In addition, a driving block 22 can be secured to the face of each rim between the ribs 5—5 at each side of the notch or recess 21 so as to increase the sufficiency of the engagement with the abutment 20 as illustrated in Fig. 5.

Obviously the construction illustrated herein could be extended to the reception of any number of rims on the same circular member. While I have described in detail the construction and arrangement of parts which I prefer to use and which my experience has demonstrated as being most desirable, it will be apparent that many of the advantages of my invention can be attained by means of other constructions and arrangements, wherefore it will be understood that I do not limit myself to the details shown herein, except as the same may be specifically recited in the claims hereto annexed or may be rendered necessary by the prior state of the art.

Having thus described my invention, what I claim is:—

1. In a vehicle wheel, the combination with the wheel-body; of two tire-supporting rims fitted side-by-side upon said body and provided on their inner faces with beveled faces inclining in the same direction; two wedge-rings adapted to be interposed between said body and said rims, respectively, and having beveled faces complementary to those on said rims; and means adapted to force together the rim on the one side and the wedge-ring on the other side of said body, the other rim being adapted to oppose the other wedge-ring, substantially as described.

2. In a vehicle wheel, the combination with the wheel-body; of two tire-supporting rims fitted side-by-side upon said body, each provided on its inner face with beveled faces inclining in the same direction; two wedge-rings adapted to be interposed between said body and said rims, respectively, and having beveled faces complementary to those on said rims; and means adapted to force together the rim on the one side and the wedge-ring on the other side of said body, the other rim being adapted to oppose the other wedge-ring, substantially as described.

3. In a vehicle wheel, the combination with the wheel-body; of two tire-supporting rims fitted side-by-side upon said body, each provided on its inner face with a pair of spaced ribs having beveled faces and all inclining in the same direction; two wedge-rings adapted to be interposed between said body and said rims, respectively, each of said rings having a pair of spaced beveled faces complementary to those of the ribs on the corresponding rim; a third ring interposed between said wedge-rings and adapted to laterally engage one thereof on one side and one of said rims on its other side; and means adapted to force together the rim on the one side and the wedge-ring on the other side of said body.

4. In a vehicle wheel, the combination with the wheel-body; of a radially projecting abutment on one side thereof; two tire-supporting rims fitted side-by-side upon said body, one of said rims engaging said abutment and each thereof being provided on its inner face with a pair of spaced ribs having beveled faces inclining away from said abutment; two wedge-rings adapted to be interposed between said body and said rims, respectively, each of said rings having a pair of spaced beveled faces complementary to those of the ribs on the corresponding rim; a third ring interposed between and laterally engaging on one side the wedge-ring disposed between said body and the abutment-engaging rim, and on the other side the outer rim; and means adapted to force the wedge-ring disposed between said body and said last-named rim toward said abutment.

5. In a vehicle wheel, the combination with the wheel-body; of a radially projecting abutment on one side thereof; two tire-supporting rims fitted side-by-side upon said body, one of said rims engaging said abutment and each thereof being provided on its inner face with a pair of spaced ribs having beveled faces inclining away from said abutment; two wedge-rings adapted to be interposed between said body and said rims, respectively, each of said rings having a pair of spaced beveled faces complementary to those of the ribs on the corresponding rim; a third ring interposed between and laterally engaging on one side the wedge-ring disposed between said body and the abutment-engaging rim, and on the other side the other rim; a flange on the opposite side of said body from said abutment adapted to engage the wedge-ring disposed between said body and said last-named rim; and means adapted to draw said flange toward said body.

6. In a vehicle wheel, the combination with the wheel-body; of a radially projecting abutment on one side thereof; two tire-supporting rims fitted side-by-side upon said body, one of said rims engaging said abutment and each thereof being provided on its inner face with a pair of spaced ribs having beveled faces inclining away from said abutment; two wedge-rings adapted to be interposed between said body and said rims, respectively, each of said rings having a pair of spaced beveled faces complementary to those of the ribs on the corresponding rim; a third ring interposed between and laterally engaging on one side the wedge-ring disposed between said body and the abutment-engaging rim, and on the other side the adjacent rib on the other rim; and means adapted to force the wedge-ring disposed between said body and said last-named rim toward said abutment.

7. In a vehicle wheel, the combination, with a circular member having a substantially cylindrical face and a plurality of annular rims adapted to surround said member, each of said rims having a laterally inclined seating portion on its inner face, of an abutment member carried by said circular member and adapted to limit the transverse movement of one of said annular members with respect thereto, a second abutment member carried by said circular member substantially parallel to the axis thereof, co-operating abutment members carried by said annular members and adapted to engage said second abutment member for preventing relative circumferential movement of the parts, a transversely inclined wedge ring, adapted to be inserted between said circular member and each of said annular rims and having seating surfaces complementary to said first seating surfaces, each of said wedge rings being discontinuous and having its ends terminating at opposite sides of said second abutment member, all of said seating surfaces converging toward said first named abutment, means carried by said circular member adapted to engage the wedge ring farthest from said first abutment and draw the same in the direction of the first abutment, and a split band surrounding said circular member and adapted to engage the rim which lies farthest from said first abutment and the wedge ring which lies nearest said first abutment, the ends of said band being spaced apart to receive said second abutment.

In testimony whereof, I hereunto affix my signature in the presence of two witnesses.

RICHARD S. BRYANT.

Witnesses:
HAROLD E. SMITH,
BRENNAN B. WEST.